(12) United States Patent
Choi et al.

(10) Patent No.: US 11,223,085 B2
(45) Date of Patent: Jan. 11, 2022

(54) BATTERY PACK FIXING APPARATUS

(71) Applicant: LG CHEM, LTD., Seoul (KR)

(72) Inventors: Yeo-Joo Choi, Daejeon (KR);
Bum-Hyun Lee, Daejeon (KR); Jae-Ki Lee, Daejeon (KR); Jin-Kyu Shin, Daejeon (KR)

(73) Assignee: LG CHEM, LTD., Seoul (KR)

( * ) Notice: Subject to any disclaimer, the term of this patent is extended or adjusted under 35 U.S.C. 154(b) by 165 days.

(21) Appl. No.: 16/332,187

(22) PCT Filed: Jul. 5, 2018

(86) PCT No.: PCT/KR2018/007661
§ 371 (c)(1),
(2) Date: Mar. 11, 2019

(87) PCT Pub. No.: WO2019/017631
PCT Pub. Date: Jan. 24, 2019

(65) Prior Publication Data
US 2019/0267590 A1    Aug. 29, 2019

(30) Foreign Application Priority Data
Jul. 19, 2017 (KR) .................. 10-2017-0091308

(51) Int. Cl.
*H01M 2/10* (2006.01)
*H01M 50/20* (2021.01)

(52) U.S. Cl.
CPC ........ *H01M 50/20* (2021.01); *H01M 2220/10* (2013.01); *Y02E 60/10* (2013.01)

(58) Field of Classification Search
None
See application file for complete search history.

(56) References Cited

U.S. PATENT DOCUMENTS

| | | | |
|---|---|---|---|
| 6,593,027 B1 | 7/2003 | Osterhart et al. | |
| 2009/0208836 A1* | 8/2009 | Fuhr | B60L 50/66 429/158 |

(Continued)

FOREIGN PATENT DOCUMENTS

| CN | 204029906 U | 12/2014 |
|---|---|---|
| CN | 205406589 U | 7/2016 |

(Continued)

OTHER PUBLICATIONS

International Search Report (PCT/ISA/210) issued in PCT/KR2018/007661, dated Oct. 23, 2018.

*Primary Examiner* — Lisa S Park
(74) *Attorney, Agent, or Firm* — Birch, Stewart, Kolasch & Birch, LLP

(57) ABSTRACT

A battery pack fixing apparatus which may effectively prevent a battery pack from being detached or separated from the fixing apparatus and may ensure easy installation regardless of the place where the battery pack is mounted, including a support unit supporting a lower portion of the battery pack and having a support plate with a coupling structure coupled to the lower portion of the battery pack; and a wall fixing unit including a fixing plate located at the rear of the battery pack loaded on the support unit, formed with a plate shape erecting upward, having a lower portion coupled to one side of the support unit and having a coupling structure coupled to a wall located at the rear.

15 Claims, 10 Drawing Sheets

(56) References Cited

U.S. PATENT DOCUMENTS

| | | | | |
|---|---|---|---|---|
| 2011/0189537 A1* | 8/2011 | Wang | ................... | H01M 50/20 |
| | | | | 429/186 |
| 2012/0263989 A1 | 10/2012 | Byun et al. | | |
| 2017/0346050 A1* | 11/2017 | Morioka | ............. | H01M 50/502 |
| 2018/0337374 A1* | 11/2018 | Matecki | ............. | H01M 10/656 |

FOREIGN PATENT DOCUMENTS

| | | | |
|---|---|---|---|
| CN | 206134759 U | | 4/2017 |
| EP | 2833436 A1 | | 2/2015 |
| EP | 3151307 A1 | | 4/2017 |
| JP | 10-210683 A | | 8/1998 |
| JP | 2012-119220 A | | 6/2012 |
| JP | 2016-018608 | * | 2/2016 |
| JP | 2016-18608 A | | 2/2016 |
| JP | 2017-21960 A | | 1/2017 |
| KR | 10-2009-0000307 A | | 1/2009 |
| KR | 10-1026745 B1 | | 4/2011 |
| KR | 10-1255243 B1 | | 4/2013 |
| KR | 10-2014-0050942 A | | 4/2014 |
| KR | 10-2017-0054016 A | | 5/2017 |
| KR | 10-2017-0054016 A | | 12/2019 |

\* cited by examiner

Related Art

BATTERY PACK FIXING APPARATUS

The present application claims priority to Korean Patent Application No. 10-2017-0091308 filed on Jul. 19, 2017 in the Republic of Korea, the disclosures of which are incorporated herein by reference.

TECHNICAL FIELD

The present disclosure relates to a battery pack fixing apparatus for fixing a battery pack including a plurality of secondary batteries, and more particularly, to a battery pack fixing apparatus including a support unit having a support plate with a coupling structure for coupling to a lower portion of a battery pack and a wall fixing unit having a fixing plate with a coupling structure for coupling to a wall.

BACKGROUND ART

Recently, secondary battery manufacturers are introducing household energy storage systems (ESS) or household battery packs as new products. The ESS or battery pack store electricity during the day with a lithium ion battery and is used when necessary to reduce electricity costs. For example, a lithium ion battery stores electricity generated by using a solar panel or a wind power generator and is then used.

For example, the household ESS or a battery pack has a size of about 120×80×20 cm and a weight of about 100 kg. Several ESS or battery packs may be used in connection. The battery pack may be configured differently in size and weight depending on storage capacity.

The household ESS or battery pack may be properly mounted and fixed to a wall or a pillar or at the ground, indoors or outdoors, by using a fixing apparatus for convenience and space utilization of the user.

In addition, the household ESS or battery pack may be detached from the fixing apparatus as the battery pack mounted at a high position drops down or the battery pack mounted to the ground falls down due to an earthquake or an external shock, or an impact may be generated between the battery pack and the fixing apparatus to damage the battery pack.

Therefore, the battery pack fixing apparatus is required to have a shock-resistant property capable of stably protecting the battery pack even in the event of an earthquake, and moreover, the battery pack should be firmly fastened not to be easily detached from the fixing apparatus due to an external impact.

FIG. 1 is a perspective view schematically showing that a conventional battery pack fixing apparatus to which a battery pack is loaded is mounted at a wall. Also, FIG. 2 is a perspective view schematically showing that a conventional battery pack fixing apparatus to which a battery pack is loaded is mounted to the ground.

Referring to FIG. 1 first, a conventional fixing apparatus 10 using a wall-mounting method for mounting a battery pack 1 to a wall surface 20 is depicted. The wall-mounting fixing apparatus 10 may mount and fix the battery pack 1 to the wall surface 20 by using a fixing member simply having a rear surface coupled to the wall surface and an upper surface formed to support a lower surface of battery pack 1.

Also, referring to FIG. 2, a conventional fixing apparatus 12 using a stand-type method for mounting the battery pack 1 to the ground is depicted. The ground-mounting apparatus 12 may mount the battery pack 1 to the ground by using a fixing member simply having a lower surface coupled to the ground and an upper surface formed to support the lower surface of the battery pack.

However, the structure of the conventional fixing apparatus for mounting the battery pack should be changed according to the purpose of using the battery pack or the place where the battery pack is mounted (to the wall or the ground), and thus two types of fixing apparatuses are required. As a result, the manufacturing cost of the battery pack fixing apparatus is increased, and the fixing apparatus less consumed becomes a stock quantity, resulting in waste of the products.

DISCLOSURE

Technical Problem

The present disclosure is designed to solve the problems of the related art, and therefore the present disclosure is directed to providing a battery pack fixing apparatus which may effectively prevent a battery pack from being detached or separated from the fixing apparatus and may ensure easy installation regardless of the place where the battery pack is mounted.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a battery pack fixing apparatus for fixing a battery pack having a plurality of secondary batteries, the battery pack fixing apparatus comprising: a support unit configured to support a lower portion of the battery pack and having a support plate with a coupling structure configured to be coupled to a lower portion of the battery pack; and a wall fixing unit including a fixing plate configured to be located at a rear of the battery pack loaded on the support unit, wherein the fixing plate has a plate shape extending upward with respect to the support unit, wherein the wall fixing unit comprises a lower portion coupled to the support unit, and coupling structure configured to be coupled to a wall located at a rear of the wall fixing unit.

Also, the support plate has an upper surface and may have a raised portion raised upward from the upper surface thereof to contact a lower surface of the battery pack.

Moreover, the raised portion may include a through hole for bolt coupling with the lower surface of the battery pack.

In addition, the support unit may have a lower sidewall extending downward from an outer circumference of the support plate.

Also, a terminal portion of the lower sidewall is formed to support the ground.

Moreover, the fixing plate may have a first fastening hole and a second fastening hole perforated to the rear of the wall fixing unit.

In addition, the first fastening hole may be provided in plural so that the plurality of first fastening holes are spaced from each other at predetermined intervals in a vertical direction at a center portion of the fixing plate.

Also, the second fastening hole may be provided in plural so that the plurality of fastening holes are spaced from each other at predetermined intervals in a vertical direction at both left and right side portions of the fixing plate.

Moreover, each first fastening hole may have a diameter smaller than the diameter of each second fastening hole.

In addition, the fixing plate may have a support portion having a raised front surface that is raised in relation to the fixing plate, the raised front surface of the support portion is configured to contact a rear surface of the battery pack.

Also, the support portion may have a heat dissipation structure configured to dissipate heat generated at the rear surface of the battery pack to the outside.

Moreover, a left sidewall and a right sidewall of the fixing plate protruding forward may be formed at both left and right side ends of the fixing plate, respectively.

In addition, lower ends of the left sidewall and the right sidewall may be coupled to a lower sidewall of the support unit.

Also, the battery pack fixing apparatus may further comprise a bridge bar having one end coupled to the left sidewall or the right sidewall of the fixing plate and the other end coupled to the lower sidewall of the support unit.

Moreover, curved grooves curved rearward may be formed at the left sidewall and the right sidewall of the fixing plate.

In addition, the battery pack fixing apparatus may further comprise a bottom fixing unit configured to fix he support unit to the ground.

Also, the bottom fixing unit may include a connection plate having a detachable structure capable of being coupled to or separated from the lower sidewall of the support unit; and a flange portion having a plate shape vertically bent and extending from the connection plate, the flange portion having a fastening groove to be coupled to the ground.

Moreover, a guiding and fixing member may be provided at a front surface of the fixing plate to guide a location where the battery pack is loaded on the support plate, the guiding and fixing member being coupled to both left and right side portions of the battery pack.

In addition, the guiding and fixing member may include a coupling unit having a coupling structure formed so that a rear surface of the coupling unit is capable of being attached to or detached from the front surface of the fixing plate; and a body unit having a pillar structure protruding forward from a front surface of the coupling unit.

Also, the body unit may have a perforation hole to be coupled to one side surface of the battery pack.

Moreover, the support plate may have a gas outlet opened to communicate with a gas venting structure formed at a lower surface of the battery pack.

In another aspect of the present disclosure, there is also provided an energy storage system, comprising a pack fixing apparatus according to the present disclosure.

In another aspect of the present disclosure, there is also provided a battery pack fixing apparatus for fixing a battery pack having a plurality of secondary batteries, the battery pack fixing apparatus comprising: a support unit configured to support a lower portion of the battery pack and having a support plate with a coupling structure to be coupled to the lower portion of the battery pack; and a wall fixing unit having a first pillar portion and a second pillar portion extending in a vertical direction from an upper surface of the support unit, the wall fixing unit including a pillar connection portion having a fixing structure to connect the first pillar portion and the second pillar portion to each other and a surface to be fixed to a wall surface.

Also, the battery pack fixing apparatus may further comprise two side plates having one side surface thereof formed to be coupled to left and right side surfaces of the support unit, respectively and outer side surfaces of the first pillar portion and the second pillar portion, respectively.

Advantageous Effects

According to an embodiment of the present disclosure, the battery pack fixing apparatus may effectively prevent a battery pack from being detached or separated from the fixing apparatus since a support unit having a support plate with a coupling structure for coupling to a lower portion of the battery pack is provided thereto.

Thus, in the present disclosure, it is possible to greatly enhance the storage stability of the battery pack even in environments not ensuring easy storage, for example earthquakes or the like.

In particular, in the present disclosure, since a raised portion raised upward is provided at the support unit, it is possible to elastically support the load of the battery pack. Thus, shocks transmitted to the battery pack due to vibration or shaking may be buffered, and so it is possible to effectively increase the shock-resistant property of the battery pack fixing apparatus.

Also, according to an embodiment of the present disclosure, regardless whether the battery pack is be to mounted at any location, either on a wall or the ground, the battery pack may be fixed to a wall surface or the ground, or both of them, by using a wall fixing unit and a bottom fixing unit. Thus, it is not needed to manufacture two types of fixing apparatuses, and thus it is possible to reduce the manufacturing cost of the battery pack fixing apparatus.

In addition, according to an embodiment of the present disclosure, since the fixing plate has two kinds of fastening holes, namely a first fastening holes and a second fastening hole, the first fastening hole and the second fastening hole may be selectively used for bolt fastening depending on the material of the wall surface to which the battery pack is mounted. Thus, it is possible to easily mount the battery pack fixing apparatus regardless of the material of the structure to which the battery pack is mounted, and it is also possible to secure a proper fixing strength.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

Figure 3:
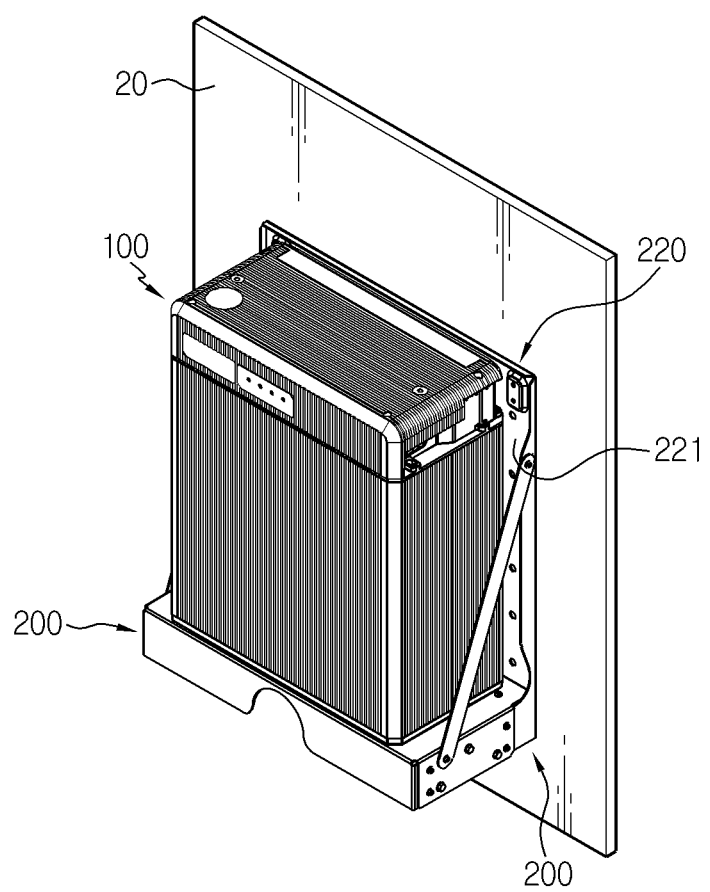
FIG. 3 is a perspective view schematically showing a battery pack fixing apparatus according to an embodiment of the present disclosure to which a battery pack is loaded.

FIG. 3 is a perspective view schematically showing a battery pack fixing apparatus to which a battery pack is loaded according to an embodiment of the present disclosure.

Referring to FIG. 3, the battery pack fixing apparatus 200 of the present disclosure may be configured to fix a battery pack 100 to a specific place.

Here, the battery pack 100 may have a plurality of secondary batteries (not shown). Specifically, the secondary battery may be a pouch-type secondary battery. The pouch-type secondary battery may have an electrode assembly, electrolyte and a pouch exterior.

Here, the electrode assembly may be configured such that at least one positive electrode plate and at least one negative electrode plate are disposed with a separator interposed therebetween. More specifically, the electrode assembly may be classified into a winding-type in which one positive electrode plate and one negative electrode plate are wound together with a separator, and a stacking-type in which a plurality of positive electrode plates and a plurality of negative electrode plates are alternately stacked with a separator interposed therebetween.

Also, the pouch exterior may be configured to include an outer insulating layer, a metal layer, and an inner adhesive layer. The pouch exterior may accommodate the electrode assembly therein. Thus, the pouch exterior is made of a metal thin film, for example an aluminum thin film, in order to protect the internal components such as the electrode assembly and the electrolyte and to complement the electrochemical properties of the electrode assembly and the electrolyte and improve the heat-dissipating property.

In addition, the aluminum thin film may be interposed between insulating layers made of an insulating material so as to ensure electrical insulation between internal components of the secondary battery such as the electrode assembly and the electrolyte and other components outside the secondary battery.

In particular, the pouch exterior may include two pouches, at least one of which may have a concave inner space. Also, the electrode assembly may be accommodated in the inner space of the pouch. In addition, sealing portions may be provided at outer circumferences of the two pouches, and the sealing portions may be fused to each other to seal the inner space accommodating the electrode assembly.

The configuration of the pouch-type secondary battery described above is obvious to those skilled in the art and thus is not be described in detail. In addition, in a battery pack 100 according to the present disclosure, various kinds of secondary batteries known at the time of filing of this application may be employed.

Figure 4:
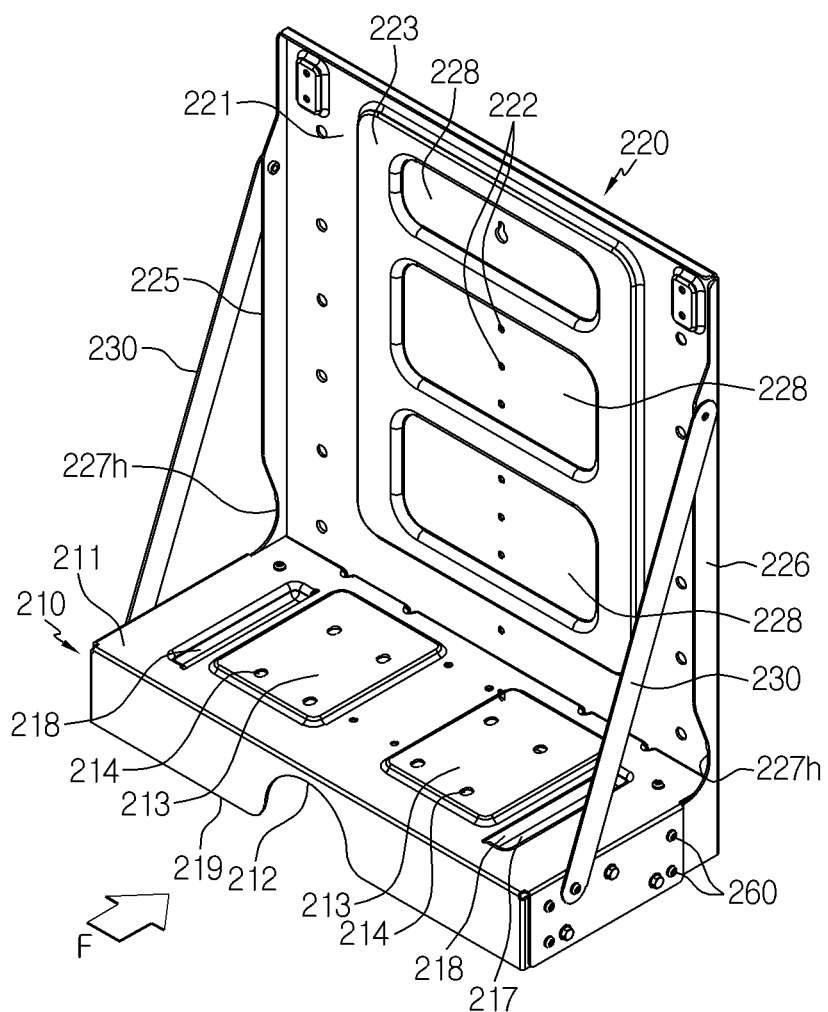
FIG. 4 is a perspective view schematically showing the battery pack fixing apparatus according to an embodiment of the present disclosure.

FIG. 4 is a perspective view schematically showing the battery pack fixing apparatus according to an embodiment of the present disclosure. Also, FIG. 5 is a rear view schematically showing the battery pack fixing apparatus according to an embodiment of the present disclosure.

Figure 5:
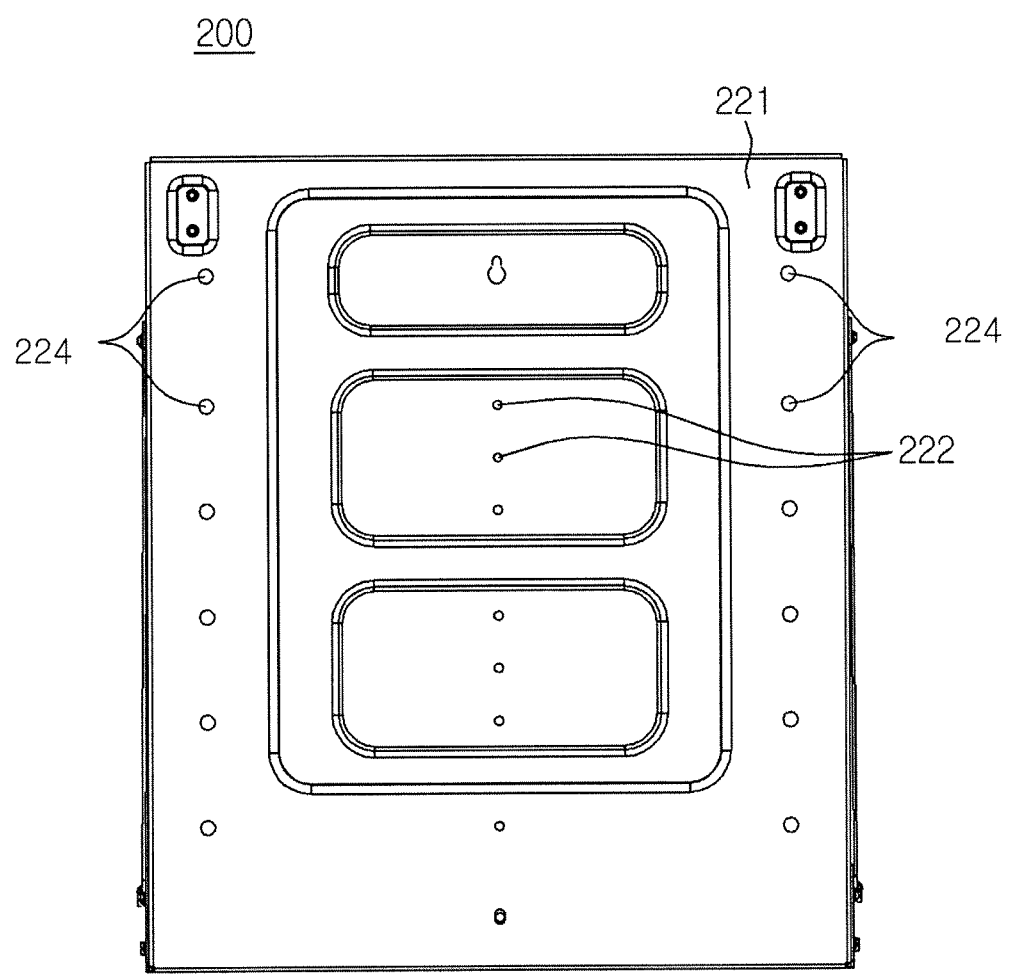
FIG. 5 is a rear view schematically showing the battery pack fixing apparatus according to an embodiment of the present disclosure.

Referring to FIGS. 3 to 5, the battery pack fixing apparatus 200 includes a support unit 210 and a wall fixing unit 220.

Specifically, the support unit 210 may include a support plate 211 configured to support a lower portion of the battery pack 100. More specifically, the support plate 211 may have a shape similar to the lower surface of the battery pack 100 or have a larger area than the lower surface of the battery pack 100 in order to support the lower portion of the battery pack 100.

For example, if the lower surface of the battery pack 100 is rectangular, the support plate 211 may have a rectangular plate with an upper surface that is wider than the area of the lower surface of the battery pack 100.

Further, the support plate 211 may have a raised portion 213 formed so that a portion thereof is raised upward from an upper surface thereof to contact the lower surface of the battery pack 100.

Specifically, the upper surface of the raised portion 213 may have a rectangular shape with rounded edges. However, the upper surface of the raised portion 213 may be formed with various shapes in consideration of the shape of the lower surface of the battery pack 100, without being limited thereto.

For example, as shown in FIG. 4, the support plate 211 may have a single raised portion 213 formed so that a partial surface at a left side based on the center of the upper surface is raised in a rectangular shape with rounded edges, when being observed in the F direction. In addition, the support plate 211 may further have another raised portion 213 formed so that a partial surface at a right side based on the center of the upper surface is raised in a rectangular shape with rounded edges, when being observed in the F direction.

Here, terms indicating directions such as "front", "rear" "up", "down", "right" and "left" may be changed depending on the position of an observer or the position of a target to be observed. However, for convenience of explanation, terms indicating directions such as "front", "rear" "up", "down", "right" and "left" will be expressed based on the observation in the F direction.

According to this configuration of the present disclosure, the raised structure of the raised portion 213 may elastically support the load of the battery pack 100, thereby relieving impacts due to external vibration or shaking. Thus, it is possible to enhance the shock-resistant property of the battery pack fixing apparatus 200.

Further, one raised portion 213 and another raised portion 213 may be spaced apart from each other at a predetermined distance. That is, by separating two raised portions 213 of the support plate 211 from each other, it is possible not only to increase the cooling effect by allowing air to flow through the empty space between two raised portions 213 but also to stably divide the load of the battery pack 100 to two raised portions 213.

Moreover, the support plate 211 may have a coupling structure to be coupled to the lower portion of the battery pack 100.

Specifically, a through hole 214 may be formed in the raised portion 213 of the support plate 211 to make bolt coupling with the lower surface of the battery pack 100. More specifically, if a screw hole (not shown) is formed in the lower portion of the battery pack 100 so that a bolt is inserted therein, the through hole 214 may be formed at a location corresponding to the screw hole of the battery pack 100 in the upper surface of the raised portion 213.

For example, as shown in FIG. 4, at the upper surface of the support plate 211, two raised portions 213 raised upward toward the lower surface of the battery pack 100 and having a rectangular shape with rounded edges may be formed. Each of the raised portions 213 may have four through holes 214.

According to this configuration of the present disclosure, since the lower surface of the battery pack 100 may be fastened to the upper surface of the raised portion 213 of the support plate 211 and thus firmly fixed, it is possible to effectively prevent the battery pack 100 from falling down due to an earthquake or an external shock.

Meanwhile, the wall fixing unit 220 may be configured to fix the battery pack fixing apparatus 200 to the wall surface 20 in a state where the battery pack 100 is mounted to the support unit 210.

Specifically, the wall fixing unit 220 may have a fixing plate 221 configured to be positioned at the rear of the battery pack 100 mounted to the support unit 210, when being observed in the F direction.

In detail, the fixing plate 221 may have a plate shape that is erect (upright) in an upper direction. More specifically, the fixing plate 221 may have one surface with a size similar to or larger than the shape of the rear surface of the battery pack 100.

For example, as shown in FIG. 3, when the rear surface of the battery pack 100 is entirely rectangular, the fixing plate 221 may have a rectangular plate structure having an area larger than that of the rear surface of the battery pack 100.

That is, the fixing plate 221 may have a size larger than the rear surface of the battery pack 100 so as to protect the rear surface of the battery pack 100 from an external impact and be stably located the rear surface of the battery pack 100 within the front surface of the fixing plate 221.

Further, the fixing plate 221 may have a support portion 223 formed so that a portion of the front surface thereof is raised forward to contact the rear surface of the battery pack 100.

Specifically, the support portion 223 may be shaped so that its raised front surface has a rectangular outer circumference with rounded edges. However, without being limited to the above shape, the raised front surface of the support portion 223 may have various shapes in consideration of the shape of the rear surface of the battery pack 100.

For example, as shown in FIG. 4, the fixing plate 221 may have the support portion 223 whose raised front surface has a rectangular outer circumference with rounded edges, and the support portion 223 may be formed to extend vertically from the upper portion to the lower portion of the fixing plate 221 to face the rear surface of the battery pack 100.

According to this configuration of the present disclosure, since the fixing plate 221 has the support portion 223 capable of effectively absorbing the impact caused by movement of the battery pack 100 due to an earthquake or an external impact, it is possible to enhance the storage stability of the battery pack 100.

Further, the support portion 223 may include a non-raised portions 228 partially formed in the front surface of the fixing plate 221. For example, as shown in FIG. 4, the support portion 223 may have three non-raised portions 228 in upper, middle and lower regions thereof.

In addition, the non-raised portion 228 of the support portion 223 may have a fastening hole 222 for bolt coupling.

According to this configuration of the present disclosure, since the fixing plate 221 has the fastening hole 222 formed in the non-raised portion 228 of the support portion 223. it is possible to ensure a sufficient area of the coupling structure for fixing the battery pack fixing apparatus 200 to the wall surface 20, and thus the battery pack 100 may be stably fixed to the wall surface 20.

Figure 6:
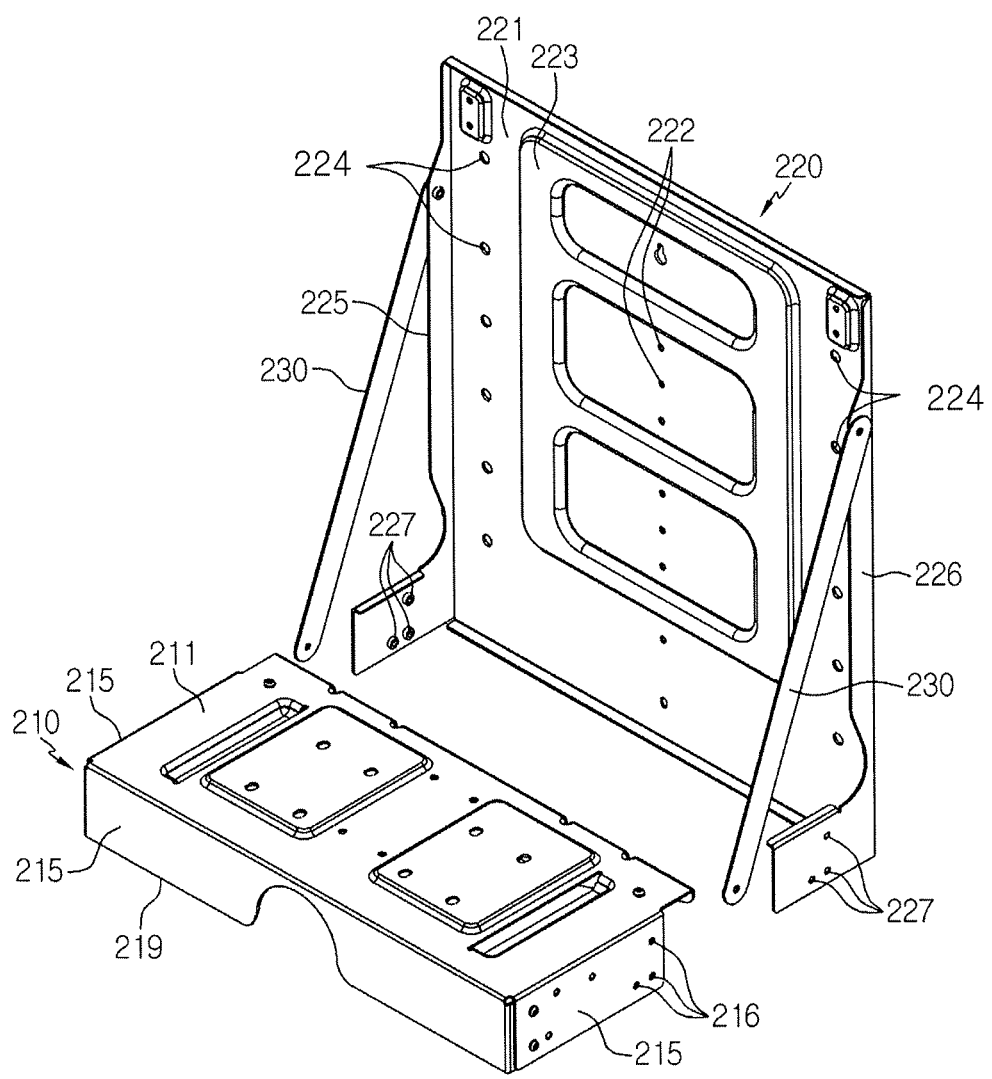
FIG. 6 is an exploded perspective view schematically showing components of the battery pack fixing apparatus of FIG. 4.

FIG. 6 is an exploded perspective view schematically showing components of the battery pack fixing apparatus of FIG. 4.

Referring to FIG. 6, the support unit 210 may include a lower sidewall 215 extending downward from the outer circumference of the support plate 211.

Specifically, if the outer circumference of the support plate 211 has a rectangular shape, the support plate 211 may have lower sidewalls 215 extending downward at front, rear, left and right sides thereof In addition, the lower sidewall 215 may extend downward to form an empty space of a predetermined size inside the support unit 210. For example, if the outer circumference of the support plate 211 has a rectangular shape, the lower sidewalls 215 may extend downward at the front, rear, left and right sides of the support unit 210 to form a hexahedral inner space.

Moreover, a terminal portion 219 of the lower sidewall 215 in the extending direction of the lower sidewall 215 may be formed to support the ground.

Further, the fixing plate 221 may have a portion coupled with the support unit 210.

Specifically, the fixing plate 221 may be formed to extend to the lower sidewall 215 of the support unit 210. Also, the fixing plate 221 may be configured so that the lower portion thereof is coupled with both left and right side portions of the support unit 210.

More specifically, the fixing plate 221 may have a left sidewall 225 and a right sidewall 226 protruding forward at both left and right side portions. Moreover, lower ends of the left sidewall 225 and the right sidewall 226 may be coupled with the lower sidewall 215 of the support unit 210.

In addition, the lower portion of the left sidewall 225 and the right sidewall 226 of the fixing plate 221 may protrude forward to a longer length, compared with the upper portion, so as to face the lower sidewall 215 of the support unit 210.

Also, the left sidewall 225 and the right sidewall 226 of the fixing plate 221 may be coupled to the lower sidewall 215 of the support unit 210 by using a bolt. Further, fastening holes 227 may be formed in the left sidewall 225 and the right sidewall 226 of the fixing plate 221 at positions corresponding to a coupling hole 216 formed in the lower sidewall 215 of the support unit 210.

That is, a fastening bolt may be inserted through the fastening hole 227 formed in the lower portion of the left sidewall 225 and the right sidewall 226 of the fixing plate 221 and through the coupling hole 216 of the lower sidewall 215, so that the left sidewall 225 or the right sidewall 226 is coupled with the lower sidewall 215.

For example, as shown in FIG. 6, three coupling holes 216 may be formed in the lower sidewall 215 formed at a right side of the support unit 210 to be coupled with the right sidewall 226 of the fixing plate 221. Also, as shown in FIG. 4, the right sidewall 226 of the fixing plate 221 may be coupled by inserting a fastening bolt (not shown) into the fastening hole 227 and the coupling hole 216 of the lower sidewall 215 at a left side of the support unit 210.

Likewise, three coupling holes (not shown) may be formed in the lower sidewall 215 formed at a left side of the support unit 210 to be coupled to the left sidewall 225 of the fixing plate 221. Also, the left sidewall 225 of the fixing plate 221 may be coupled by inserting a fastening bolt into the fastening hole 227 and the coupling hole of the lower sidewall 215 at a left side of the support unit 210.

Meanwhile, the fixing plate 221 may have fastening holes 222, 223 for being coupled with a wall positioned at the rear side.

Specifically, the fixing plate 221 may include two kinds of fastening holes, namely first fastening holes 222 and second fastening holes 224, perforating rearward. More specifically, a plurality of first fastening holes 222 may be formed to be spaced apart from each other at a predetermined interval in a vertical direction at the central portion of the fixing plate 221.

For example, as shown in FIG. 5, six first fastening holes 222 spaced apart from each other at a predetermined interval in a vertical direction may be formed in the central portion of the fixing plate 221.

In addition, a plurality of second fastening holes 224 may be formed to be spaced apart from each other at a predetermined interval in a vertical direction in both left and right side portions of the fixing plate 221.

For example, as shown in FIG. 5, six second fastening holes 224 spaced from each other at a predetermined interval in the vertical direction may be formed in the left side portion of the fixing plate 221, and also six second fastening holes 224 spaced apart from each other at a predetermined interval in the vertical direction may be formed in the right side portion of the fixing plate 221.

In addition, the first fastening hole 222 may have a diameter smaller than the diameter of the second fastening hole 223.

Specifically, the first fastening hole 222 may have a smaller diameter than the second fastening hole 223 that is used for bolt coupling with a wall made of a material having a greater mechanical strength than wood, so that the battery pack fixing apparatus 200 may be bolted and fixed to a wall made of a hard material such as wood.

In addition, the second fastening hole 223 may have a greater diameter than the first fastening hole 222 that is used for bolt coupling with a wall made of a material having a smaller mechanical strength than wood, so that the battery pack fixing apparatus 200 may be bolted and fixed to a wall made of a hard material such as concrete.

According to this configuration of the present disclosure, since the fixing plate 221 has two kinds of fastening holes, namely the first fastening holes 222 and the second fastening hole 223, the first fastening hole 222 and the second fastening hole 223 may be selectively used for bolt coupling depending on the material of the wall surface 20 to which the battery pack 100 is mounted. Thus, it is possible to mount the battery pack fixing apparatus 200 easily, and an appropriate fixing strength may be secured.

Referring to FIGS. 4 and 6 again, the battery pack fixing apparatus 200 may further include a bridge bar 230 configured to prevent the support unit 210 from being bent (sagged) downward due to the load of the battery pack 100.

Specifically, both ends of the bridge bar 230 may be coupled to the fixing plate 221 and the lower sidewall 215 of the support unit 210. More specifically, the bridge bar 230 may have one end coupled to the left sidewall 225 or the right sidewall 226 of the fixing plate 221 and the other end coupled to the lower sidewall 215 of the support unit 210.

That is, the bridge bar 230 may have a structure coupling and connecting the fixing plate 221 and the support unit 210, so that the fixing plate 221 fixed to the wall surface 20 may endure the load of the battery pack 100, which is transmitted to the support unit 210.

For example, as shown in FIG. 4, one bridge bar 230 may have one end coupled to the left sidewall 225 of the fixing plate 221 and the other end coupled to the lower sidewall 215 formed at a left side of the support unit 210. Also, another bridge bar 230 may have one end coupled to the right sidewall 226 of the fixing plate 221 and the other end coupled to the lower sidewall 215 formed at a right side of the support unit 210.

According to this configuration of the present disclosure, the battery pack fixing apparatus 200 may prevent the battery pack fixing apparatus 200 from being deformed due to the load of the battery pack 100 even though the battery pack 100 is stored for a long time in a state of being fixed to the wall. Thus, it is possible to effectively increase the durability of the battery pack fixing apparatus 200.

In addition, the fixing plate 221 may have a curved groove 227h for distributing the load of the battery pack 100 transmitted by the bridge bar 230.

Specifically, the curved grooves 227h curved rearward may be formed at the left sidewall 225 and the right sidewall 226 of the fixing plate 221. More specifically, the curved grooves 227h may be formed in a region where the load of the battery pack 100 delivered by the bridge 230 of the left sidewall 225 and the right sidewall 226 is easily concentrated.

For example, the curved groove 227h may be formed adjacent to a region where the left sidewall 225 and the right sidewall 226 of the fixing plate 221 are connected to the lower sidewall 215. As shown in FIG. 4, the curved groove 227h curved rearward may be formed in a lower portion of the fixing plate 221 where the left sidewall 225 is connected to the lower sidewall 215. Also, the curved groove 227h curved rearward may be formed in a lower portion of the fixing plate 221 where the right sidewall 226 is connected to the lower sidewall 215.

Figure 7:
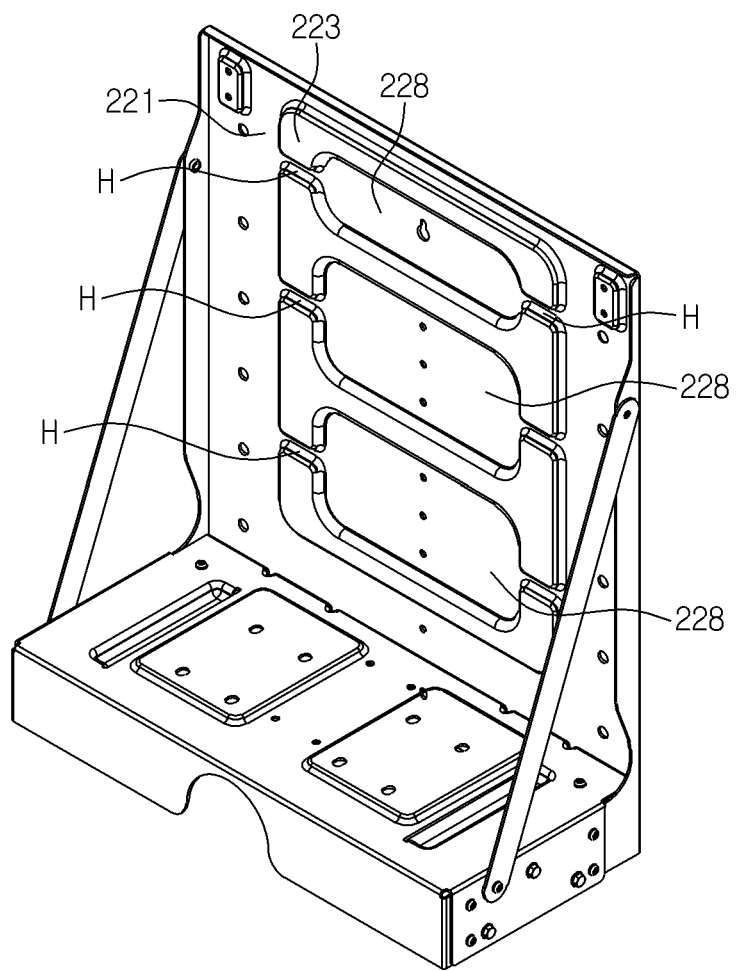
FIG. 7 is a perspective view schematically showing a battery pack fixing apparatus according to another embodiment of the present disclosure.

FIG. 7 is a perspective view schematically showing a battery pack fixing apparatus according to another embodiment of the present disclosure.

Referring to FIG. 7 along with FIG. 3, a battery pack fixing apparatus 201 according to another embodiment of the present invention may further include a heat dissipation structure formed at the support portion 223 of the fixing plate 221 to discharge heat generated at the rear surface of the battery pack 100 to the outside, compared to the battery pack fixing apparatus 200 of the former embodiment.

Specifically, the heat dissipation structure may be formed such that the non-raised portion 228 of the support portion 223 extends from the center of the support portion 223 to an outer circumference thereof. More specifically, the heat dissipation structure may have an open structure H formed so that the non-raised portion 228 extends from the center of the support portion 223 to the outer circumference of one side or both sides thereof.

For example, as shown in FIG. 7, if three non-raised portions 228 are formed in upper, middle and lower regions of the support portion 223, the non-raised portion 228 may have open structures H respectively extending from the centers of the upper, middle and lower regions of the support portion 223 to outer circumferences of both left and right sides thereof, to form the heat dissipation structure.

According to this configuration of the present invention, since the heat dissipation structure has an open structure through which an external air may flow in and out so that the heat accumulated in the empty space separated from the rear surface of the battery pack 100 may be transferred to the outside, the heat generated from the battery pack 100 may be effectively discharged to the outside.

Figure 8:
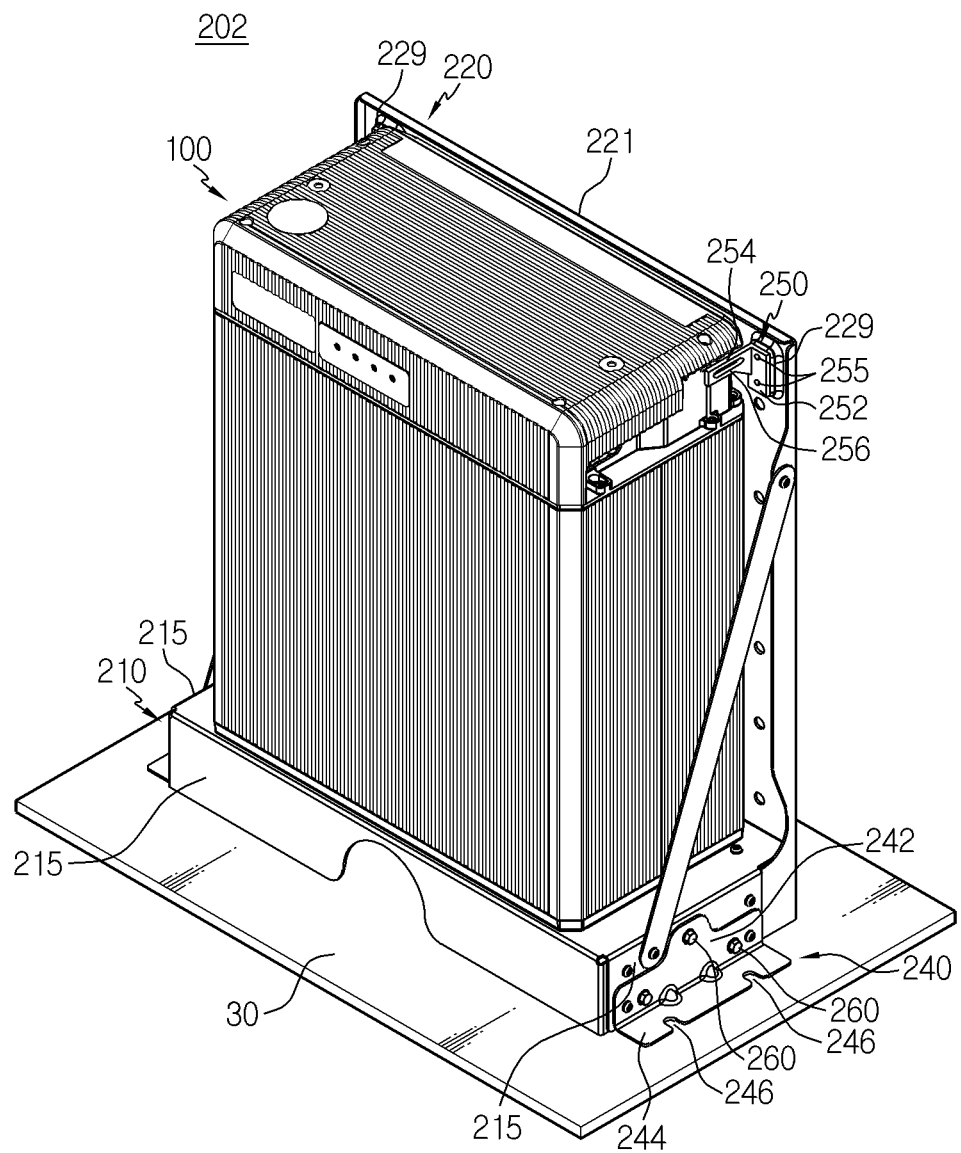
FIG. 8 is a perspective view schematically showing the battery pack fixing apparatus according to another embodiment of the present disclosure to which a battery pack is loaded.

FIG. 8 is a perspective view schematically showing the battery pack fixing apparatus according to another embodiment of the present disclosure to which a battery pack is loaded. Also, FIG. 9 is an exploded perspective view schematically showing that components of the battery pack fixing apparatus of FIG. 8 are disassembled.

Figure 9:
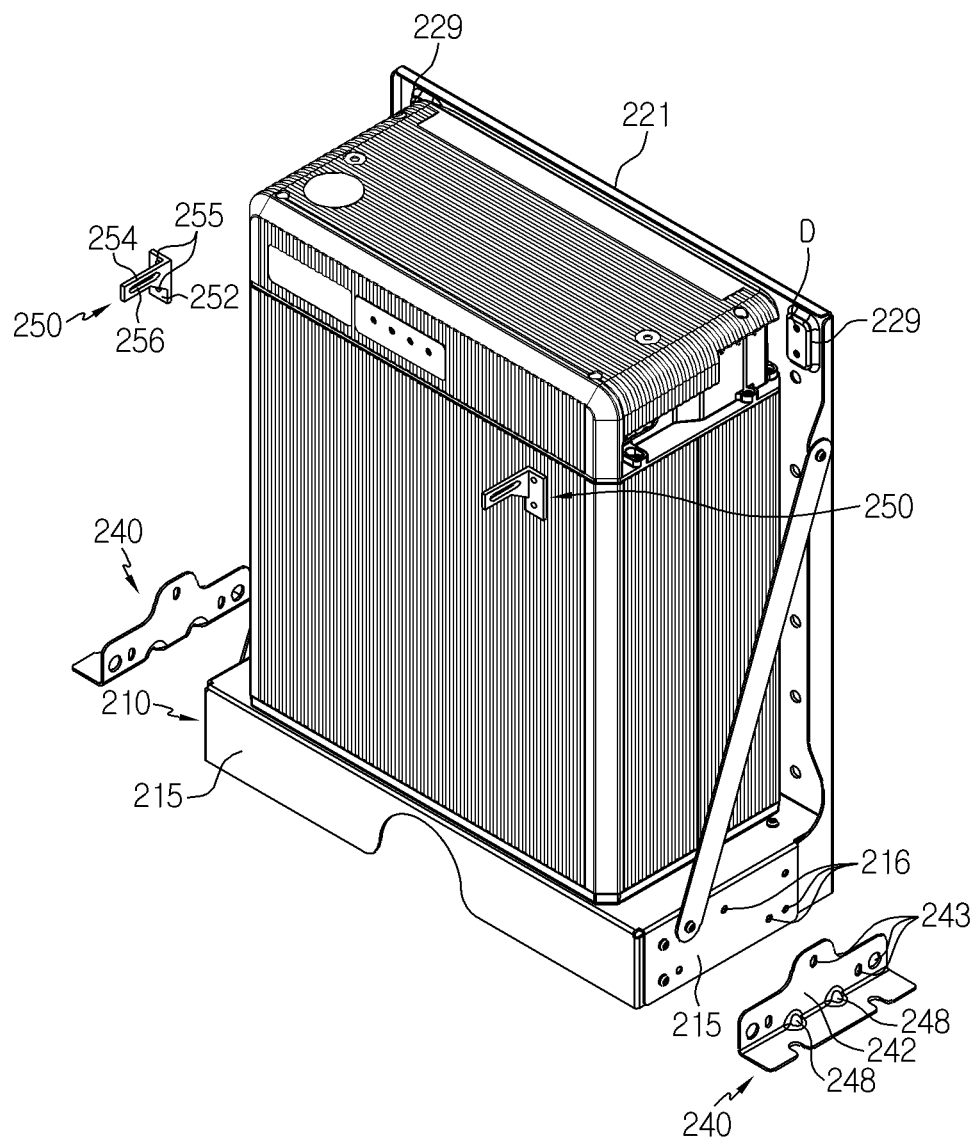
FIG. 9 is an exploded perspective view schematically showing that components of the battery pack fixing apparatus of FIG. 8 are disassembled.

Referring to FIGS. 8 and 9, a battery pack fixing apparatus 202 may further include a bottom fixing unit 240 configured to fix the support unit 210 to the ground 30.

Specifically, the bottom fixing unit 240 may include a connection plate 242 having a detachable structure so as to be coupled to or separated from at least one of the lower sidewalls 215 of the support unit 210.

More specifically, the connection plate 242 may have a plate shape so as to be in surface contact with the outer surface of the lower sidewall 215. Also, the detachable structure may be a bolt-coupling structure in which the connection plate 242 is formed to allow both engagement and disengagement with the lower sidewall 215 of the support unit 210.

That is, when the bottom fixing unit 240 is coupled to the support unit 210, the fastening bolt 260 may be inserted into the detachable hole 243 formed in the connection plate 242 and the coupling hole 216 of the lower sidewall 215 of the support unit 210.

In addition, when the bottom fixing unit 240 is detached from the support unit 210, the detachable structure may be configured so that the fastening bolt 260 is unscrewed by releasing fastening bolt 260 inserted and fastened into the detachable hole 243 formed in the connection plate 242 and the coupling hole 216 of the lower sidewall 215 of the support unit 210.

According to this configuration of the present disclosure, the battery pack fixing apparatus 202 of the present disclosure may optionally be attached to the ground 30 by using the bottom fixing unit 240, if the place where the battery pack fixing apparatus 202 is to be mounted includes the ground 30 (or, the floor). Accordingly, the battery pack fixing apparatus 202 may be firmly fixed to both the wall surface and the ground 30, and thus it is possible to effectively prevent the battery pack 100 from being detached or separated from the fixing apparatus due to an earthquake or an external impact.

Moreover, the bottom fixing unit 240 may include a flange portion 244 having a plate shape perpendicularly bent and extending from the connection plate 242.

Specifically, if the lower sidewall 215 of the support unit 210 is formed perpendicular to the ground 30, the connection plate 242 may be formed perpendicular to the ground 30 so as to be in surface contact with the outer surface of the lower sidewall 215. Accordingly, the flange portion 244 may be bent perpendicularly to the connection plate 242 so as to be in surface contact with the ground 30.

In addition, the flange portion 244 may have a fastening groove 246 for coupling with the ground 30.

Specifically, the fastening groove 246 may be a groove recessed inwardly at an outer circumference of the flange portion 244. For example, the fastening groove 246 may have various shapes, such as a semicircular shape, a semi-elliptical shape, a triangular shape, a rectangular shape, and the like. As shown in FIG. 8, the fastening grooves 246 may be formed to be recessed in a semi-elliptical shape.

Also, a fastening bolt (not shown) may be inserted into the fastening groove 246 so that the flange portion 244 is coupled to the ground 30. At this time, the ground 30 may have a fixing hole (not shown) at a position corresponding to the fastening groove 246.

According to this configuration of the present disclosure, the battery pack fixing apparatus 202 may be stably fixed to the ground 30 by means of the fastening groove 246 of the flange portion 244.

In addition, the bottom fixing unit 240 may have a convex portion 248 formed so that a portion of the bottom fixing unit 240 protrudes outward at a bent portion formed by the connection plate 242 and the flange portion 244. The convex portion 248 may be formed to support the outer surface of the connection plate 242 and the upper surface of the flange portion 244.

Further, the convex portion 248 may be formed so that a portion of one surface of the bottom fixing unit 240 protrudes outward.

According to this configuration of the present disclosure, as the convex portion 248 is formed at a portion of the bottom fixing unit 240, without using a separate support member, the stress concentrated on the bent structure between the connection plate 242 and the flange portion 244 may be distributed, and it is possible to prevent the bent structure from being deformed. Thus, it is possible to reduce the manufacturing cost and effectively prevent the bottom fixing unit 240 from being deformed by an external force.

Referring to FIG. 8 again, a guiding and fixing member 250 for guiding the position where the battery pack 100 is mounted on the support plate 211 may be further provided to the front surface of the fixing plate 221.

Specifically, the guiding and fixing member 250 may be formed to guide a position in a left and right direction where the battery pack 100 is mounted on the support plate 211. Accordingly, the guiding and fixing member 250 may be formed at both left and right side portions of the front surface of the fixing plate 221, respectively.

For example, as shown in FIG. 8, two guiding and fixing members 250 may be formed near edge portions of a left upper corner and a right upper corner of the front surface of the fixing plate 221, respectively.

Moreover, one end of the guiding and fixing member 250 may be bolted to the front surface of the fixing plate 221. Also, the other end of the guiding and fixing member 250 may be fastened and fixed to the left and right side portions of the battery pack 100.

Specifically, the guiding and fixing member 250 may include a coupling unit 252 and a body unit 254.

Here, the coupling unit 252 may have a coupling structure so that a rear surface thereof may be detachably attached to the front surface of the fixing plate 221. More specifically, the coupling unit 252 may have a plate shape formed parallel to the front surface of the fixing plate 221 and having a coupling structure. Further, the coupling unit 252 may have an opening 255 for bolt coupling.

That is, when the guiding and fixing member 250 is attached to the front surface of the fixing plate 221, the coupling unit 252 may be bolted to the front surface of the fixing plate 221 through the opening 255. Conversely, when the guiding and fixing member 250 is detached from the front surface of the fixing plate 221, the guiding and fixing member 250 may be separated from the fixing plate 221 by loosening and removing the bolt fastened into the opening 255 of the coupling unit 252.

In addition, the body unit 254 may have a pillar structure protruding forward from the front surface of the coupling unit 252. Also, the pillar structure of the body unit 254 may have a perforation hole 256 formed for coupling with one side surface of the battery pack 100.

For example, as shown in FIG. 8, two guiding and fixing members 250 may be added to the front surface of the fixing plate 221. The two guiding and fixing members 250 may include a coupling unit 252 fastened and fixed to the front surface of the fixing plate 221 and a body unit 254 bolted to one or both of left and right sides of the battery pack 100 through the perforation hole 256.

Further, referring to FIG. 9 again, a raised structure 229 raised forward and an insert groove D for bolt coupling may be formed at the front surface of the fixing plate 221 so that the guiding and fixing member 250 is fastened and fixed thereto.

For example, as shown in FIG. 9, two raised structures 229 for fastening the guiding and fixing member 250 may be formed at both side portions of the front surface of the fixing plate 221. Also, two insert grooves D for bolt coupling may be formed at the raised front surface of the raised structure 229.

Meanwhile, referring to FIG. 4 again, the support plate 211 may have a gas outlet 218 formed to discharge gas generated inside the battery pack 100.

At this time, the battery pack 100 may have a gas venting structure (not shown) that is opened to discharge gas to the outside when the gas generated during the charging and discharging process needs to be discharged to the outside as the internal pressure of the battery pack 100 increases.

In addition, the gas venting structure may be formed at the lower surface of the battery pack 100 that faces the support plate 211. Accordingly, the support plate 211 may have a gas outlet 218 that is opened to communicate with the gas venting structure formed at the lower surface of the battery pack 100.

Further, the support plate 211 may include a gas guiding portion 217 extending from the gas outlet 218 and recessed downward from the upper surface of the support plate 211. Specifically, the gas guiding portion 217 may be formed to guide the gas discharged from the gas venting structure of the battery pack 100 to be moved in an intended direction.

For example, as shown in FIG. 4, the gas guiding portion 217 may have a concave structure recessed downward from the upper surface of the support plate 211 and having one side connected to the gas outlet 218 so that the gas discharged downward from the battery pack 100 may be moved to the center of the inner space of the lower portion of the support unit 210.

Further, a curved portion 212 recessed upward from the terminal portion 219 of the lower sidewall 215 may be formed at the lower sidewall 215 of the support unit 210. The curved portion 212 may be formed to discharge the gas contained in the inner space of the support unit 210 to the outside.

For example, as shown in FIG. 4, the curved portion 212 recessed upward at the terminal portion 219 may be formed at the center of the lower sidewall 215 formed at the front surface of the support unit 210.

According to this configuration of the present disclosure, since the battery pack fixing apparatus 200 of the present disclosure may move and discharge the toxic gas discharged from the battery pack 100 to an intended place without clogging, it is possible to effectively prevent explosion or the like and ensure safety against leakage of the toxic gas.

Figure 10:
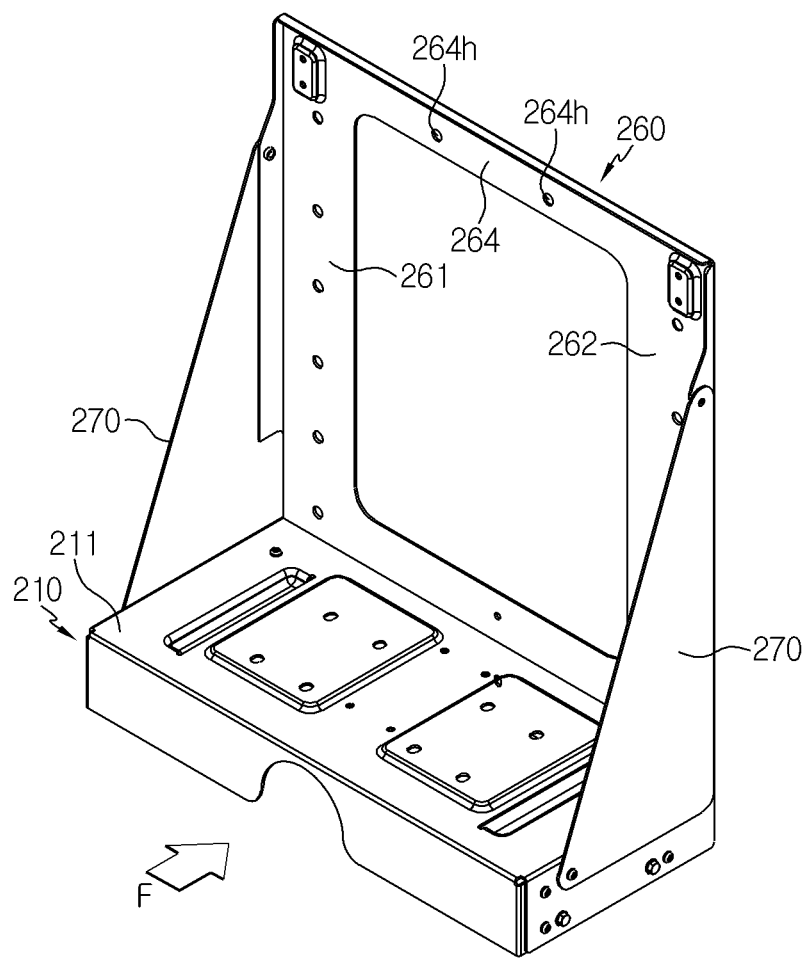
FIG. 10 is a perspective view schematically showing a battery pack fixing apparatus according to still another embodiment of the present disclosure to which a battery pack is loaded.

FIG. 10 is a perspective view schematically showing a battery pack fixing apparatus according to still another embodiment of the present disclosure to which a battery pack is loaded.

Figure 1:
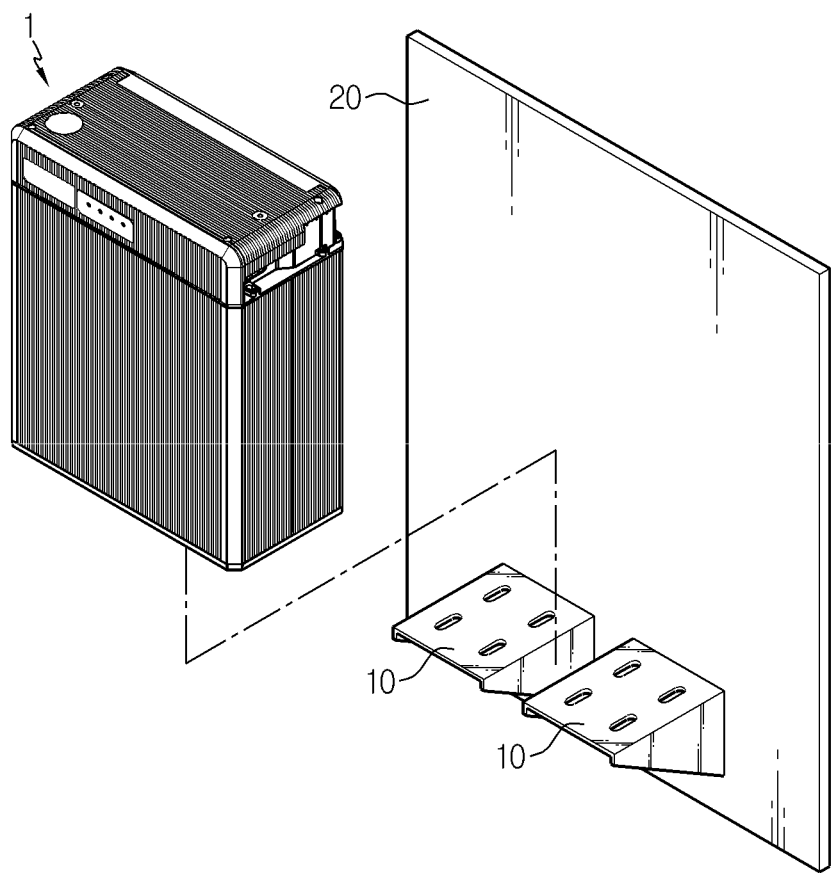
FIG. 1 is a perspective view schematically showing that a conventional battery pack fixing apparatus to which a battery pack is loaded is mounted at a wall.
Figure 2:
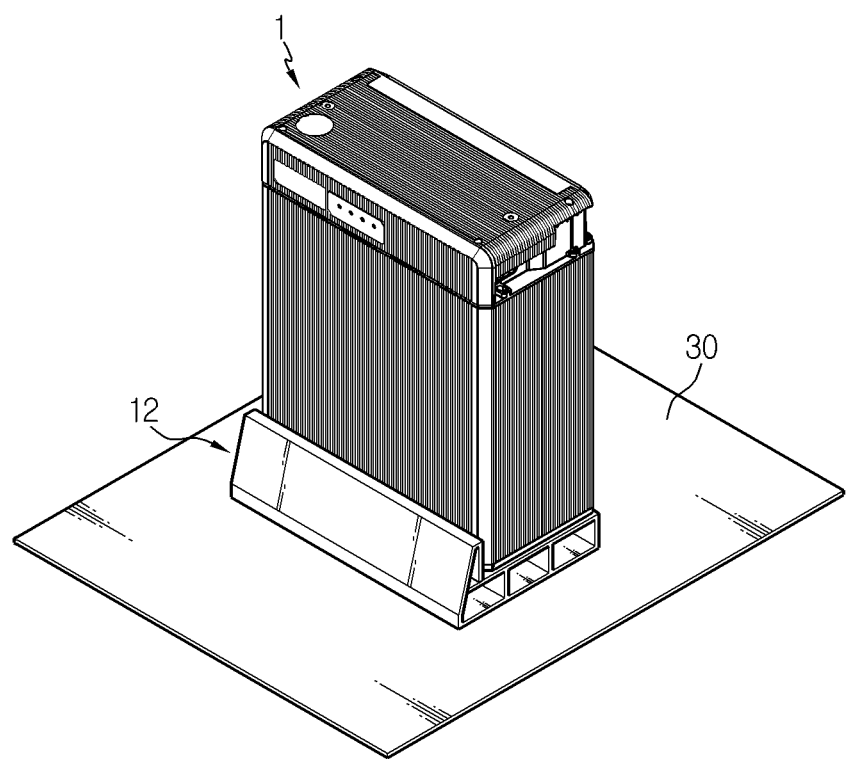
FIG. 2 is a perspective view schematically showing that a conventional battery pack fixing apparatus to which a battery pack is loaded is mounted to the ground.

Referring to FIGS. 2 and 10, a battery pack fixing apparatus 200B according to another embodiment of the present disclosure is used for fixing a battery pack having a plurality of secondary batteries and may include a support unit 210 and a wall surface coupling unit 260.

Specifically, the support unit 210 of FIG. 10 may include a support plate 211 formed to support the lower portion of the battery pack 100 and having a coupling structure to be coupled to the lower portion of the battery pack 100.

The support unit 210 may have the same configuration as the support unit 210 (FIG. 4) employed at the battery pack fixing apparatus 200 (FIG. 4) according to an embodiment of the present disclosure, and thus the support unit will not be described in detail here.

In addition, the wall surface coupling unit 260 may include a first pillar portion 261 and a second pillar portion 262.

Specifically, the first pillar portion 261 and the second pillar portion 262 may have a pillar shape extending to be vertically erect from the upper surface of the support plate 211 of the support unit 210. In addition, the pillar shape may be, for example, a rectangular or circular tube shape with a hollow structure. Alternatively, the pillar shape may be a plate shape extending erectly.

Moreover, the wall surface coupling unit 260 may have a pillar connection portion 264 connecting the first pillar portion 261 and the second pillar portion 262.

Specifically, the pillar connection portion 264 may have a plate with one end coupled to the first pillar portion 261 and the other end coupled to the second pillar portion 262.

Also, the pillar connection portion 264 may have a fixing structure so that one rear surface thereof is fixed to the wall surface. Specifically, the fixing structure may be a bolt insert hole 264h for bolt coupling.

In addition, the battery pack fixing apparatus 200B may have at least one side plate 270 formed so that one side surface thereof is coupled to the left and right side surfaces of the support unit 210 and the outer side surfaces of the first pillar portion 261 and the second pillar portion 262.

For example, as shown in FIG. 10, the side plate 270 may be coupled to the left side surface of the support unit 210 and the outer side surface (the left side surface) of the first pillar portion 261 when observed in the F direction, and another side plate 270 may be coupled to the right side surface of the support unit 210 and the outer side surface (the right side surface) of the second pillar portion 262.

Thus, according to this configuration of the present disclosure, the side plate firmly fixes the support unit 210 and the wall surface coupling unit 260, thereby effectively increasing the durability of the fixing apparatus.

In addition, an energy storage system according to the present disclosure may include the battery pack fixing apparatus according to the present disclosure.

Further, the energy storage system may be a system that stores power generated by a power generation unit and supplies the power to a power grid. In addition, the power grid may be a commercial power grid or an individual power grid in a small area. Moreover, in some cases, the energy storage system may be a power storage device that stores power in a smart grid, or the energy storage system may be a load or a power conversion device that immediately consumes the generated power.

Meanwhile, even though terms indicating directions such as "up", "down", "right", "left", "front" and "rear" are used in this specification, it will be apparent to those skilled in the art that these terms are only for convenience of explanation and may vary depending on the position of a target to be observed or the position of an observer.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

REFERENCE SIGNS

| | |
|---|---|
| 100: battery pack | 200: battery pack fixing apparatus |
| 210: support unit | 220: wall fixing unit |
| 211: support plate | 221: fixing plate |
| 213: raised portion | 223: support portion |
| 215: lower sidewall | 225, 226: left sidewall, right sidewall |
| 230: bridge bar | 240: bottom fixing unit |
| 250: guiding and fixing member | 242: connection plate |
| 252: coupling unit | 244: flange portion |
| 254: body unit | 218: gas outlet |

INDUSTRIAL APPLICABILITY

The present disclosure relates to a battery pack fixing apparatus. Also, the present disclosure may be industrially available for the industries in relation to the battery pack fixing apparatus configured to fix a battery pack and the energy storage system having the battery pack.

What is claimed is:

1. A battery pack fixing apparatus for fixing a battery pack having a plurality of secondary batteries, the battery pack fixing apparatus comprising:
a support unit configured to support a lower portion of the battery pack and having a support plate with a coupling structure configured to be coupled to the lower portion of the battery pack; and
a wall fixing unit including a fixing plate configured to be located at a rear of the battery pack loaded on the support unit,
wherein the fixing plate has a plate shape extending upward with respect to the support unit,
wherein the wall fixing unit comprises a lower portion coupled to the support unit, and a coupling structure configured to be coupled to a wall located at a rear of the wall fixing unit,
wherein the support plate has an upper surface and a gas outlet in the upper surface opened to communicate with a gas venting structure formed at a lower surface of the battery pack,
wherein the support unit further comprises a lower sidewall, and
wherein the lower sidewall extends downward from an outer circumference of the support plate, a terminal portion of the lower sidewall in a direction along which the lower sidewall extends being formed to support the ground and a curved portion recessed upward from the terminal portion of the lower sidewall being formed in the lower sidewall.

2. The battery pack fixing apparatus according to claim 1, wherein the support plate has a raised portion raised upward from the upper surface,
wherein the raised portion of the support plate is configured to contact the lower surface of the battery pack, and
wherein the raised portion includes a through hole for bolt coupling with the lower surface of the battery pack.

3. The battery pack fixing apparatus according to claim 1, wherein the fixing plate has a plurality of first fastening holes and a plurality of second fastening holes extending to the rear of the wall fixing unit,
wherein the plurality of first fastening holes are spaced from each other at predetermined intervals in a vertical direction at a center portion of the fixing plate,
wherein the plurality of second fastening holes are spaced from each other at predetermined intervals in a vertical direction at both left and right side portions of the fixing plate, and
wherein each first fastening hole has a diameter smaller than the diameter of each second fastening hole.

4. The battery pack fixing apparatus according to claim 3, wherein the fixing plate has a support portion having a raised front surface that is raised in relation to the fixing plate, the raised front surface of the support portion configured to contact a rear surface of the battery pack.

5. The battery pack fixing apparatus according to claim 4, wherein the support portion has a heat dissipation structure configured to dissipate heat generated at the rear surface of the battery pack to the outside.

6. The battery pack fixing apparatus according to claim 1, wherein the fixing plate includes a left sidewall and a right sidewall protruding forward at left and right side ends of the fixing plate, respectively, and lower ends of the left sidewall and the right sidewall are coupled to a lower sidewall of the support unit.

7. The battery pack fixing apparatus according to claim 6, further comprising:
a bridge bar having one end coupled to the left sidewall or the right sidewall of the fixing plate and the other end coupled to the lower sidewall of the support unit.

8. The battery pack fixing apparatus according to claim 7, wherein curved grooves curved rearward are formed at the left sidewall and the right sidewall of the fixing plate.

9. The battery pack fixing apparatus according to claim 1, further comprising:
a bottom fixing unit configured to fix the support unit to the ground,
wherein the bottom fixing unit includes:
a connection plate having a detachable structure capable of being coupled to or separated from the lower sidewall of the support unit; and a flange portion having a plate shape vertically bent and extending from the connection plate, the flange portion having a fastening groove to be coupled to the ground.

10. A battery pack fixing apparatus for fixing a battery pack having a plurality of secondary batteries, the battery pack fixing apparatus comprising:

a support unit configured to support a lower portion of the battery pack and having a support plate with a coupling structure configured to be coupled to the lower portion of the battery pack; and a wall fixing unit including a fixing plate configured to be located at a rear of the battery pack loaded on the support unit, wherein the fixing plate has a plate shape extending upward with respect to the support unit, wherein the wall fixing unit comprises a lower portion coupled to the support unit, and a coupling structure configured to be coupled to a wall located at a rear of the wall fixing unit wherein a guiding and fixing member is provided at a front surface of the fixing plate to guide a location where the battery pack is loaded on the support plate, the guiding and fixing member being coupled to both left and right side portions of the battery pack, and wherein the guiding and fixing member includes:

a coupling unit having a coupling structure formed so that a rear surface of the coupling unit is capable of being attached to or detached from the front surface of the fixing plate; and a body unit having a pillar structure protruding forward from a front surface of the coupling unit, wherein the body unit has a perforation hole configured to be coupled to one side surface of the battery pack.

11. An energy storage system, comprising a battery pack fixing apparatus defined in claim 1.

12. The battery pack fixing apparatus according to claim 1, wherein the wall fixing unit has a first pillar portion and a second pillar portion extending in a vertical direction from an upper surface of the support unit, the wall fixing unit including a pillar connection portion having a fixing structure to connect the first pillar portion and the second pillar portion to each other and a surface configured to be fixed to a wall surface.

13. The battery pack fixing apparatus according to claim 12, further comprising:

two side plates having one side surface thereof coupled to left and right side surfaces of the support unit, respectively, and outer side surfaces of the first pillar portion and the second pillar portion, respectively.

14. The battery pack fixing apparatus according to claim 2, wherein the raised portion is rectangular and the gas outlet is parallel to the raised portion.

15. The battery pack fixing apparatus according to claim 2, further comprising a battery module, wherein a bottom edge of the battery module contacts the upper surface of the support plate and surrounds the raised portion and the gas outlet.

\* \* \* \* \*